(12) United States Patent
Park et al.

(10) Patent No.: US 7,176,711 B2
(45) Date of Patent: Feb. 13, 2007

(54) ON-DIE TERMINATION IMPEDANCE CALIBRATION DEVICE

(75) Inventors: Nak Kyu Park, Kyoungki-do (KR); Seong Ik Cho, Jeollabuk-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 92 days.

(21) Appl. No.: 11/113,868

(22) Filed: Apr. 25, 2005

(65) Prior Publication Data

US 2005/0242833 A1   Nov. 3, 2005

(30) Foreign Application Priority Data

Apr. 28, 2004   (KR) .................... 10-2004-0029594

(51) Int. Cl.
*H03K 17/16* (2006.01)
*H03K 19/003* (2006.01)
*G01R 35/00* (2006.01)

(52) U.S. Cl. ..................... 326/30; 326/31; 326/32; 324/601; 333/17.3

(58) Field of Classification Search ........... 326/30–32; 324/601; 333/17.3
See application file for complete search history.

(56) References Cited

U.S. PATENT DOCUMENTS

| 6,307,424 | B1 * | 10/2001 | Lee ........................... 327/530 |
| 6,624,659 | B1 * | 9/2003 | Abraham et al. .............. 326/82 |
| 6,924,660 | B2 * | 8/2005 | Nguyen et al. ................ 326/30 |
| 6,980,020 | B2 * | 12/2005 | Best et al. ..................... 326/30 |

\* cited by examiner

*Primary Examiner*—Rexford Barnie
*Assistant Examiner*—Jason Crawford
(74) *Attorney, Agent, or Firm*—Ladas & Parry LLP

(57) ABSTRACT

Disclosed is an on-die termination ('ODT') impedance calibration device. The ODT impedance calibration device comprises: a pulse generator for outputting a calibration signal of a pulse type for calibrating an ODT impedance; an M-bit counter for counting the number of pulses of the calibration signal; a first maximum counter trigger signal generator controlled by the M-bit counter; an N-bit counter for counting the number of pulses of the calibration signal; a second maximum counter trigger signal generator controlled by the N-bit counter; a delay unit for receiving a delay signal and outputting the delay signal after a predetermined period of time; an update trigger signal generator for outputting a pulse signal which is toggled according to an output signal of the delay unit; and an ODT impedance calibration unit for receiving the calibration signal and outputting a control signal for calibrating an ODT impedance.

6 Claims, 7 Drawing Sheets

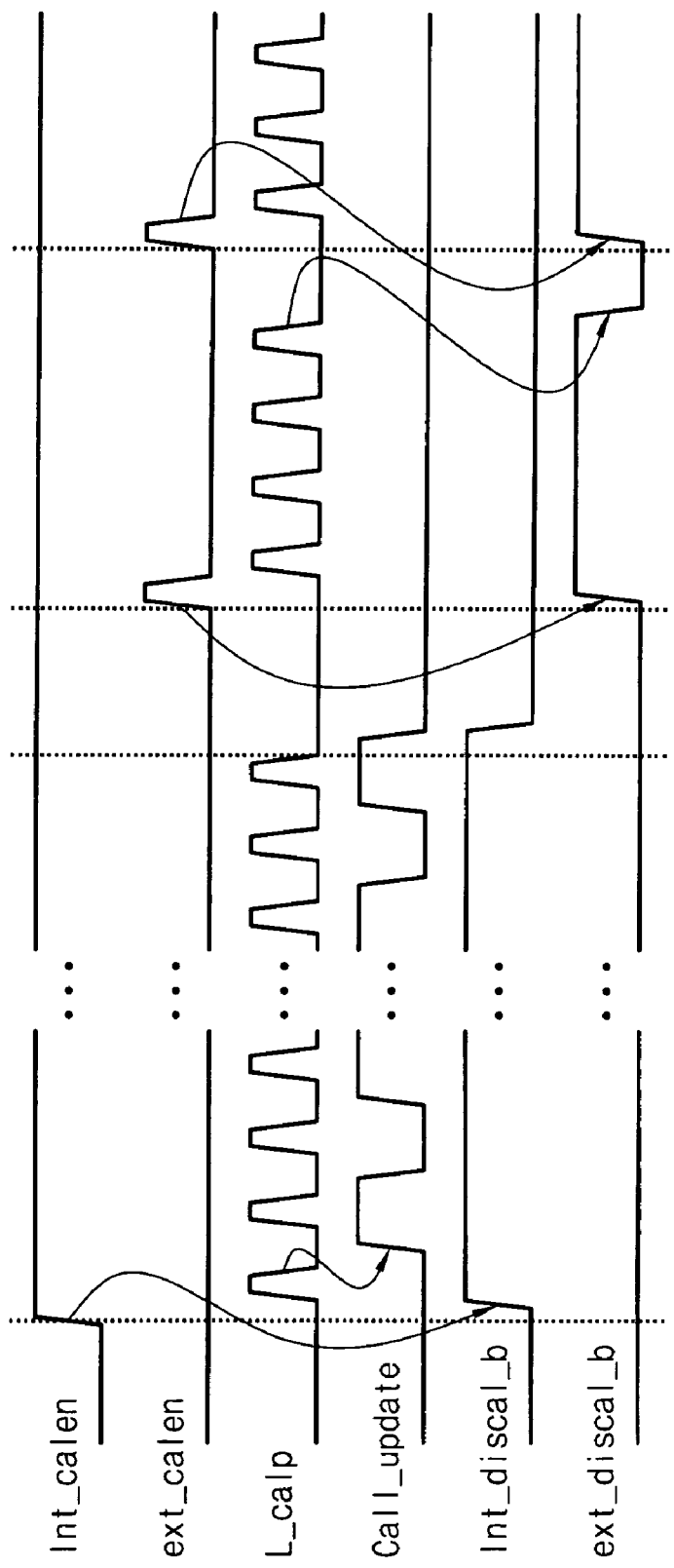

ON-DIE TERMINATION IMPEDANCE CALIBRATION DEVICE

BACKGROUND OF THE INVENTION

1. Field of the Invention

The present invention relates to an on-die termination impedance calibration device, and more particularly to an on-die termination impedance calibration device which is insensitive to the process environment, voltage environment and temperature environment, and can perform the calibration according to its own path and its own schedule.

2. Description of the Prior Art

In general, when a pulse or a signal (hereinafter, referred to as "signal") is transferred from a bus line to another bus line, a portion of the transferred signal is reflected if impedances of the bus lines are not matched to each other. An on-die termination (hereinafter, referred to as "ODT") technique is used to reduce such reflection of the signal.

A semiconductor device such as a memory device transmits/receives data and the like to/from an exterior system. When an impedance of a bus line connected between a semiconductor device and an exterior system is not matched with an impedance of a signal line in the semiconductor device which is directly connected to the bus line, transmitted data are reflected.

Recently, high-speed semiconductor devices have generally employed an impedance matching device for preventing the above-mentioned data reflection. Herein, such an impedance matching device is called an 'ODT device'.

An ODT device is typically installed on a line connected with an input/output pad of a semiconductor device and includes resistance elements. The resistance elements are connected between the line and a terminal at which a predetermined power is supplied, and typically include MOS transistors. The MOS transistor has a channel resistance characteristic of being selectively turned on/off, thereby acting as a resistance element.

FIG. 1 is a block diagram illustrating a conventional ODT impedance calibration device. The conventional ODT impedance calibration device includes an oscillator 110, a maximum counter trigger signal generator 120, an M-bit counter 11, and a pulse generator 130 for a global area, and includes an oscillator 140, a pulse generator 150, a maximum counter trigger signal generator 160, an N-bit counter 12, an ODT impedance calibration unit 170 for a local area.

An internal calibration enable signal 'int_calen' is a signal applied from the interior of the semiconductor device in order to perform an ODT impedance calibration mode.

An external calibration enable signal 'ext_calen' is applied from an exterior during a normal operation of the semiconductor device. That is, such an external calibration enable signal 'ext_calen' is applied to perform an ODT impedance calibration corresponding to property change of the semiconductor device, which is caused by variations of a process environment, a voltage environment, a temperature environment, etc., during a normal operation of the semiconductor device.

The oscillator 110 receives a high-level internal calibration enable signal 'int_calen' and outputs an oscillation signal. 'osc_clk'. The M-bit counter 11 counts the number of pulses of the oscillation signal 'osc_clk'.

The maximum counter trigger signal generator 120 outputs an output signal 'int_discal' under the control of the M-bit counter 11, and changes the output signal 'int_discal' from a low level into high level when the M-bit counter 11 counts the $M^{th}$ pulse of the oscillation signal 'osc_clk'.

The pulse generator 130 receives the external calibration enable signal 'ext_calen' and outputs a pulse signal 'G_calp' in synchronization with a rising edge of the oscillation signal 'osc_clk'.

The oscillator 140 receives the pulse signal 'G_calp' output from the pulse generator 130 which is located in the global area, and controls the operation of the pulse generator 150 which is located in the local area. As shown FIG. 4, the pulse generator 150 outputs a pulse signal 'L_calp' in synchronization with a rising edge of the pulse signal 'G_calp', with a plurality of pulses following the pulse signal 'L_calp'.

The N-bit counter 12 counts the number of pulses of the pulse generator 150. The maximum counter trigger signal generator 160 is controlled by the N-bit counter 12. When the $N^{th}$ pulse of the pulse signal 'L_calp' is generated, the maximum counter trigger signal generator 160 disables the operation of the pulse generator 150.

The ODT impedance calibration unit 170 receives the pulse signal 'L_calp' of the pulse generator 150, and generates and outputs a plurality of control signals 'code<0:n−1>'.

Accordingly, the ODT impedance is calibrated according to enable states of the control signals 'code<0:n−1>'.

To be specific, the ODT impedance is calibrated by an ODT block 220. As shown in FIG. 3, the ODT block includes resistors, which have different values (i.e., AΩ, BΩ, CΩ and DΩ) from each other and are connected in parallel with each other, and switching elements. The switching elements are constructed with PMOS transistors which determine the selection of the resistors according to the control signals 'code<0:n−1>'.

Meanwhile, as shown in FIG. 2, the ODT impedance calibration unit 170 includes a comparator 210, the ODT block 220 and an N-bit counter 230.

The operations of the comparator 210 and the N-bit counter 230 are controlled according to the pulse signal 'L_calp' of he pulse generator 150.

The comparator 210 compares a reference voltage 'Vref' and the voltage of a line 'ZQ_in'.

The N-bit counter 230 receives an output signal 'Com_out' of the comparator 210 and outputs a control signal 'code<0:n−1>' for controlling the ODT block 220.

The ODT block 220 controls the turn-on/off of the PMOS transistors according to the control signal 'code<0:n−1>', thereby calibrating the impedance of the line 'ZQ_in'. A resistance RQ connected to the line 'ZQ_in' is included in the ODT impedance.

FIG. 4 is a timing chart for explaining the operation of the conventional ODT impedance calibration device.

In general, in order for a semiconductor device to normally operate, it is necessary to perform an ODT impedance calibration process. The ODT impedance calibration process is employed to establish an optimum ODT impedance value of an internal line of the semiconductor device which receives an exterior signal. It is necessary to optimize the ODT impedance in order to prevent distortion of an input signal and interference between signals.

At the initial state, an ODT impedance calibration operation in the semiconductor device is performed by an internal calibration enable signal 'int_calen'.

It is necessary to recalibrate the ODT impedance in order to reflect temperature change, voltage change, etc. while the semiconductor device is normally being performed. In this case, the semiconductor device receives an external calibration enable signal 'ext_calen' and recalibrates the ODT impedance. However, since the external calibration enable signal 'ext_calen' has a predetermined minimum period of time, there is a limitation in the number of times by which the ODT impedance can be recalibrated.

Also, when the operation properties of the oscillator 110 and the oscillator 140, pulse signal 'L_calp' and pulse signal 'G_calp' may be overlapped with each other as indicated by mark 'a' in FIG. 4.

Also, when temperature, voltage and the like of the semiconductor device rapidly change during a normal operation, a problem described below is caused.

That is, as indicated by mark 'b' in FIG. 4, since the generation period of the external calibration enable signal 'ext_calen' during a normal operation has been decided, the number of pulses of signal 'L_calp' is limited even when temperature, voltage and the like rapidly change, so that it is difficult to optimize an ODT impedance.

SUMMARY OF THE INVENTION

Accordingly, the present invention has been made to solve the above-mentioned problems occurring in the prior art, and an object of the present invention is to provide an on-die termination impedance calibration device for initially optimizing an ODT impedance by an ODT impedance calibration operation internally-executed in a semiconductor device and then optimizing an ODT impedance during normal operation of the semiconductor device.

In order to accomplish this object, there is provided an on-die termination (hereinafter, referred to as 'ODT') impedance calibration device comprising: a pulse generator for receiving a first enable signal supplied during an initial operation state and a second enable signal supplied from an exterior during a normal operation state and outputting a multi-pulse for calibrating an ODT impedance corresponding to reception of each of the first enable signal and the second enable signal; an M-bit counter and an N-bit counter for counting the number of pulses of the multi-pulse; a first maximum counter trigger signal generator for being enabled by the second enable signal and outputting a signal for disabling the pulse generator upon receiving a signal from the M-bit counter, the signal corresponding to a result of M bit counting of pulses of the multi-pulse; a second maximum counter trigger signal generator for being enabled by the first enable signal and outputting a signal for disabling the pulse generator upon receiving a signal from the N-bit counter, the signal corresponding to a result of N bit counting of pulses of the multi-pulse; a delay unit for delaying the multi-pulse for a predetermined period of time; an update trigger signal generator for controlling a time point for output control of the multi-pulse by outputting a pulse signal, which is toggled by a delay multi-pulse output from the delay unit, as an update signal to the pulse generator in an enable state of the first enable signal; and an ODT impedance calibration unit for receiving the multi-pulse and outputting a control signal for calibrating an ODT impedance.

In accordance with another aspect of the present invention, the update trigger signal generator outputs a signal toggled in synchronization with a falling edge of an output signal of the delay unit.

In accordance with still another aspect of the present invention, the update trigger signal generator has a pipeline structure and toggles and outputs the delay multi-pulse when the first enable signal is enabled.

In accordance with still another aspect of the present invention, the update trigger signal generator includes a switch and a latch, the switch performs a switching operation by the multi-pulse, an operation of the latch for storing a signal transferred from the switch is controlled by the first enable signal, and at least two pairs of the switch and the latch are serially connected.

In accordance with still another aspect of the present invention, the pulse generator comprises: a rising edge pulse generator for outputting a calibration start signal synchronized with a rising edge of the first enable signal; a rising and falling edge pulse generator for outputting pulses synchronized with a rising edge and a falling edge of the update signal; a first NAND circuit for performing a logical NAND function on an output of the rising and falling edge pulse generator and an output of the second maximum counter trigger signal generator; a second NAND circuit for performing the logical NAND function on the output of the rising and falling edge pulse generator and an output of the first maximum counter trigger signal generator; a NOR circuit for performing a logical NOR function on outputs of the rising edge pulse generator, the first NAND circuit and the second NAND circuit; and a third NAND circuit for performing the logical NAND function on the second enable signal and an output of the NOR circuit, thereby outputting the multi-pulse.

BRIEF DESCRIPTION OF THE DRAWINGS

The above and other objects, features and advantages of the present invention will be more apparent from the following detailed description taken in conjunction with the accompanying drawings, in which:

FIG. 8 is a timing chart for explaining the operation of the ODT impedance calibration device according to an embodiment of the present invention.

DETAILED DESCRIPTION OF THE PREFERRED EMBODIMENTS

Figure 1:
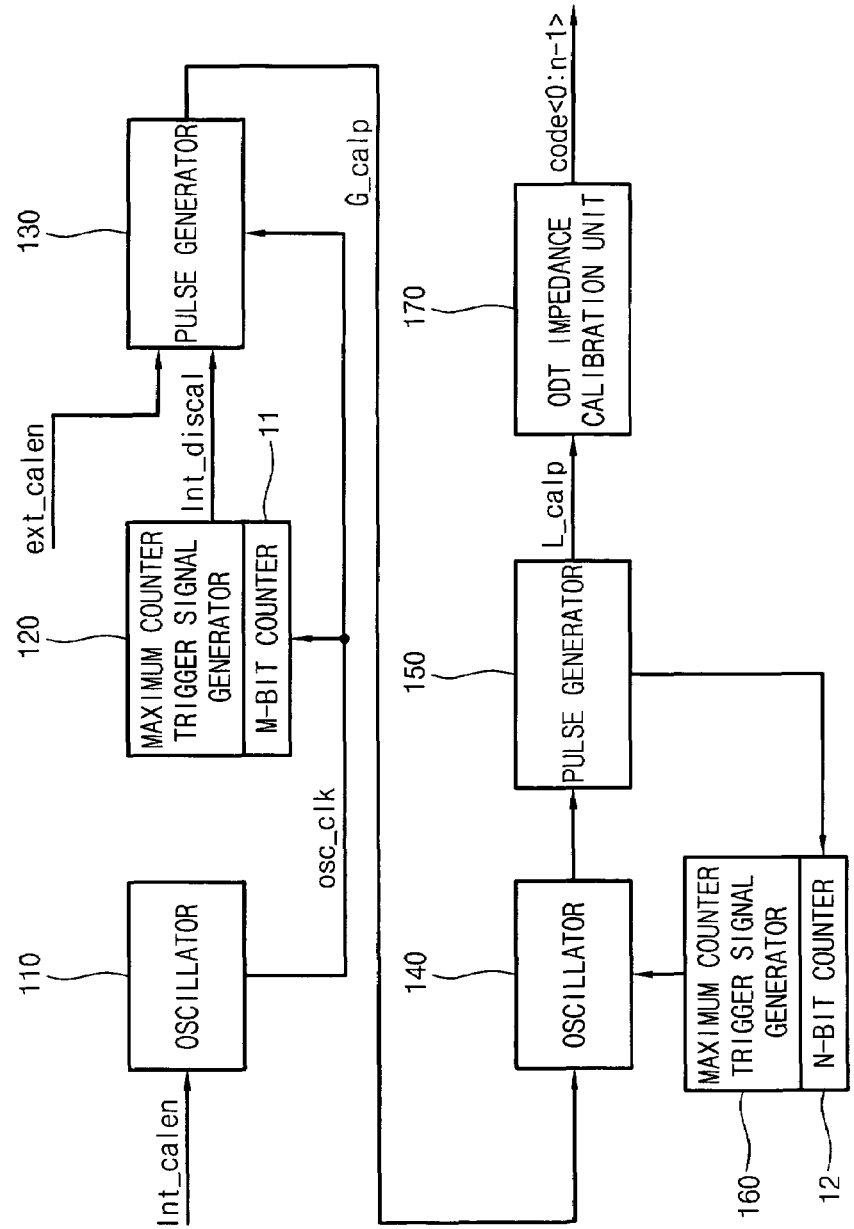
FIG. 1 is a block diagram illustrating a conventional ODT (On-Die Termination) impedance calibration device.
Figure 2:
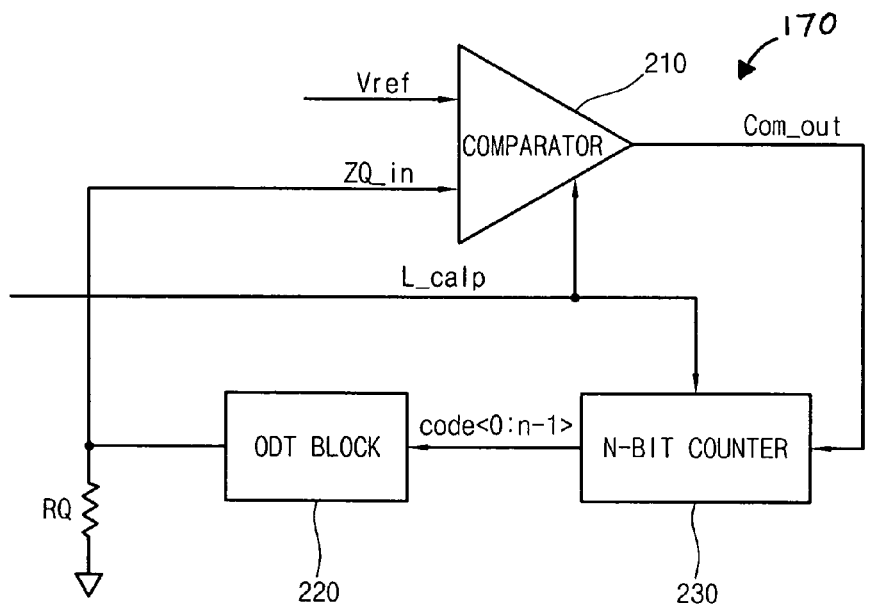
FIG. 2 is a detailed circuit illustrating an ODT impedance calibration unit shown in FIG. 1.
Figure 3:
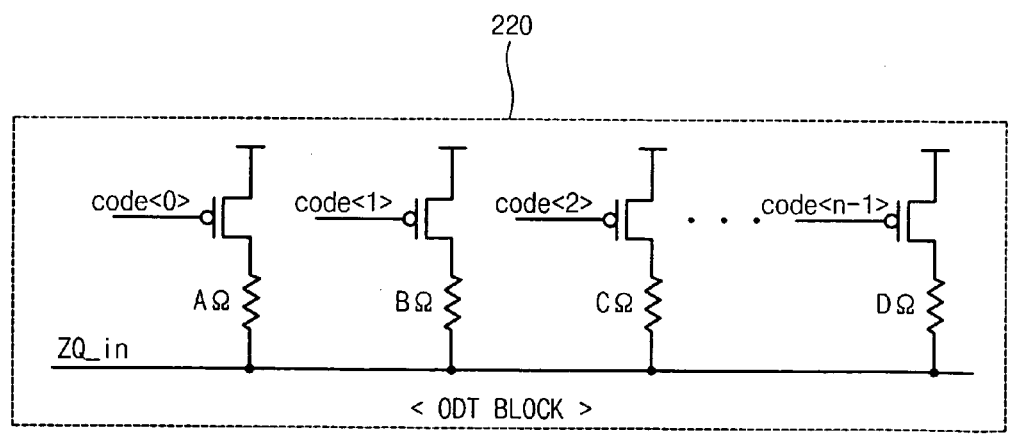
FIG. 3 is a detailed circuit illustrating an ODT block shown in FIG. 2.
Figure 4:
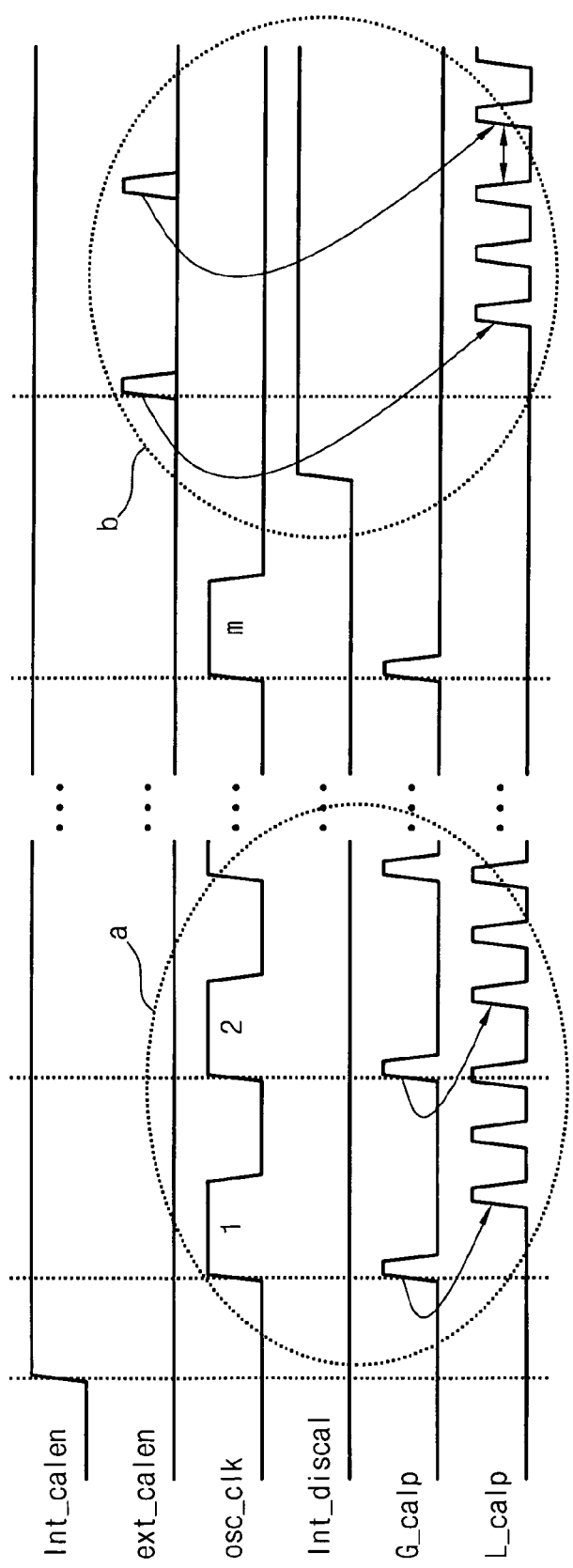
FIG. 4 is a timing chart for explaining the operation of the conventional ODT impedance calibration device.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 5:
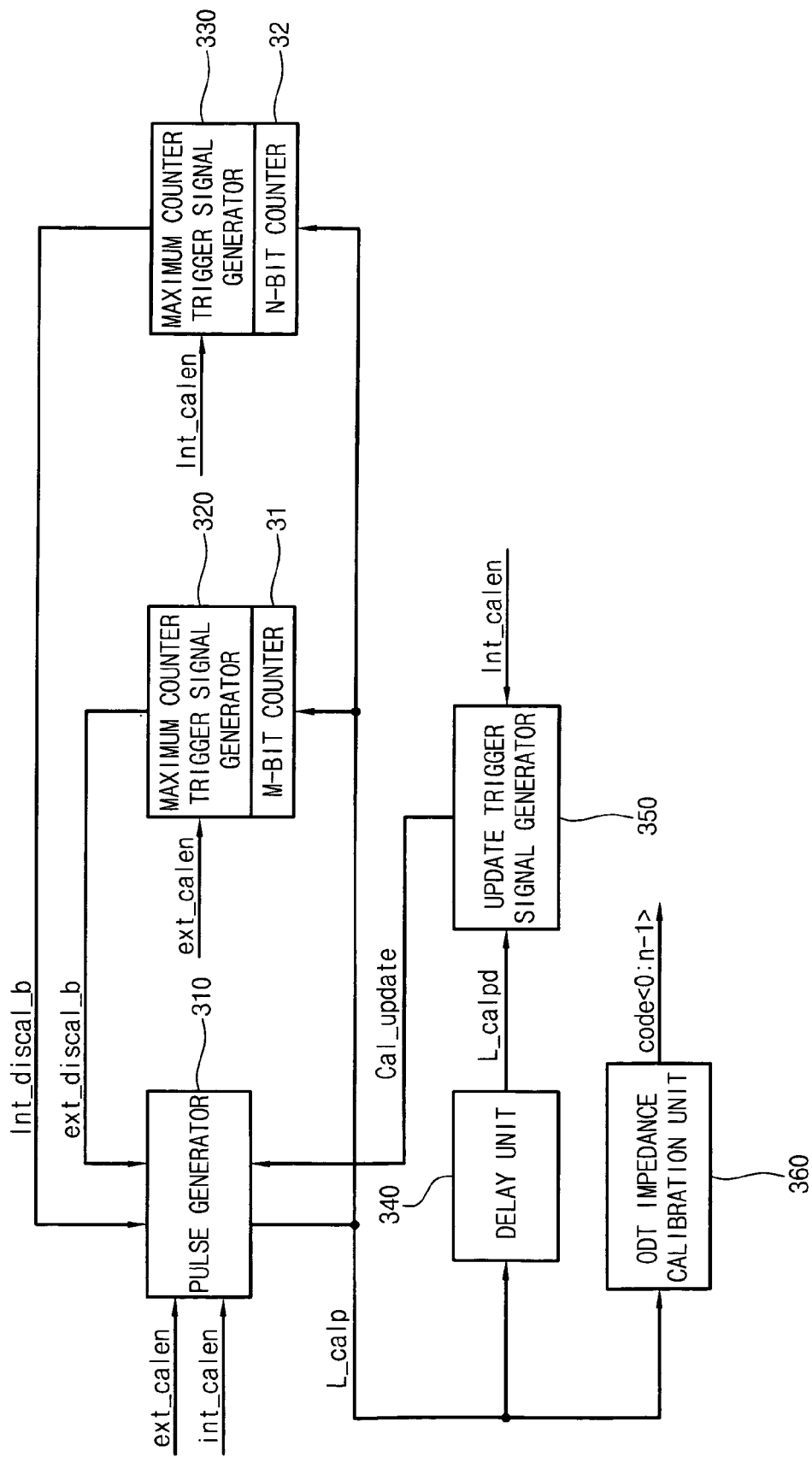
FIG. 5 is a block diagram illustrating an ODT impedance calibration device according to an embodiment of the present invention.

FIG. 5 is a block diagram illustrating an ODT (on-die termination) impedance calibration device according to an embodiment of the present invention. The ODT impedance calibration device includes a pulse generator 310, maximum counter trigger signal generators 320 and 330, an M-bit counter 31, an N-bit counter 32, a delay unit 340, an update trigger signal generator 350, and an ODT impedance calibration unit 360.

Herein, an internal calibration enable signal 'int_calen' is generated from the interior of a semiconductor device in order to perform an ODT impedance calibration mode.

An external calibration enable signal 'ext_calen' is applied from the exterior of the semiconductor device in order to calibrate the impedance of the ODT device when the property of the semiconductor device changes depending on temperature change, voltage change and the like during a normal operation.

The pulse generator 310 receives the internal calibration enable signal 'int_calen' and the external calibration enable signal 'ext_calen', and outputs a multi-pulse 'L_calp' for calibrating an ODT impedance.

In the initial state, a high-level internal calibration enable signal 'int_calen' is applied to the pulse generator 310, the pulse generator 310 outputs a signal (i.e., a multi-pulse 'L_calp') having continuous pulses as shown in FIG. 8 for a predetermined period of time.

The multi-pulse 'L_calp' output from the pulse generator 310 is applied to the M-bit counter 31 and the N-bit counter 32. Herein, the M-bit counter 31 and the N-bit counter 32 are circuits for counting the number of pulses of the multi-pulse 'L_calp'.

The maximum counter trigger signal generator 320 receives the external calibration enable signal 'ext_calen'. The operation of the maximum counter trigger signal generator 320 is controlled by the M-bit counter 31 in an enable state of the external calibration enable signal 'ext_calen'. An output signal of the maximum counter trigger signal generator 320 is represented as 'ext_discal_b'.

The maximum counter trigger signal generator 320 is supplied with an external calibration enable signal 'ext_calen', and disables an output signal 'ext_discal_b' when the maximum counter trigger signal generator 320 is supplied with a bit corresponding to a maximum count from the M-bit counter 31. That is, an output signal 'ext_discal_b', as a waveform shown in FIG. 8, of the maximum counter trigger signal generator 320 is applied to the pulse generator 310.

The maximum counter trigger signal generator 330 receives an internal calibration enable signal 'int_calen'. The operation of the maximum counter trigger signal generator 330 is controlled by the N-bit counter 32 in an enable state of the internal calibration enable signal 'int_calen'. An output signal of the maximum counter trigger signal generator 330 is represented as 'int_discal_b'.

The maximum counter trigger signal generator 330 disables an output signal 'int_discal_b', when the internal calibration enable signal 'int_calen' changes into an enable state and a bit corresponding to a maximum count from the N-bit counter 32 is supplied to the maximum counter trigger signal generator 330. That is, an output signal 'int_discal_b', as a waveform shown in FIG. 8, of the maximum counter trigger signal generator 330 is applied to the pulse generator 310.

The pulse generator 310 generates a multi-pulse 'L_calp' in the initial state by an internal calibration enable signal 'int_calen'.

Thereafter, the number of bits of the multi-pulse 'L_calp' is counted in the N-bit counter 32. When the maximum counter trigger signal generator 330 is supplied with a maximum count bit 'N' from the N-bit counter 32, the maximum counter trigger signal generator 330 changes the output signal 'int_discal_b' from a high level to a low level.

When the maximum counter trigger signal generator 330 changes the output signal 'int_discal_b' from the high level to the low level, the pulse generator 310 stops generating the multi-pulse 'L_calp' corresponding to an initially internal calibration enable signal 'int_calen'.

Next, the pulse generator 310 receives an external calibration enable signal 'ext_calen', the pulse generator 310 generates a multi-pulse 'L_calp' by the external calibration enable signal 'ext_calen'.

The number of bits of the multi-pulse 'L_calp' is counted in the M-bit counter 31. When the maximum counter trigger signal generator 320 is supplied with a maximum count bit 'M' from the M-bit counter 31, the maximum counter trigger signal generator 320 changes the output signal 'ext_discal_b' from a high level to a low level.

As a result, the pulse generator 310 stops generating the multi-pulse 'L_calp' corresponding to the external calibration enable signal 'ext_calen' during a normal operation thereof. Thereafter, when the pulse generator 310 receives the next external calibration enable signal 'ext_calen', the pulse generator 310 generates a multi-pulse 'L_calp' corresponding to the received signal.

Figure 6:
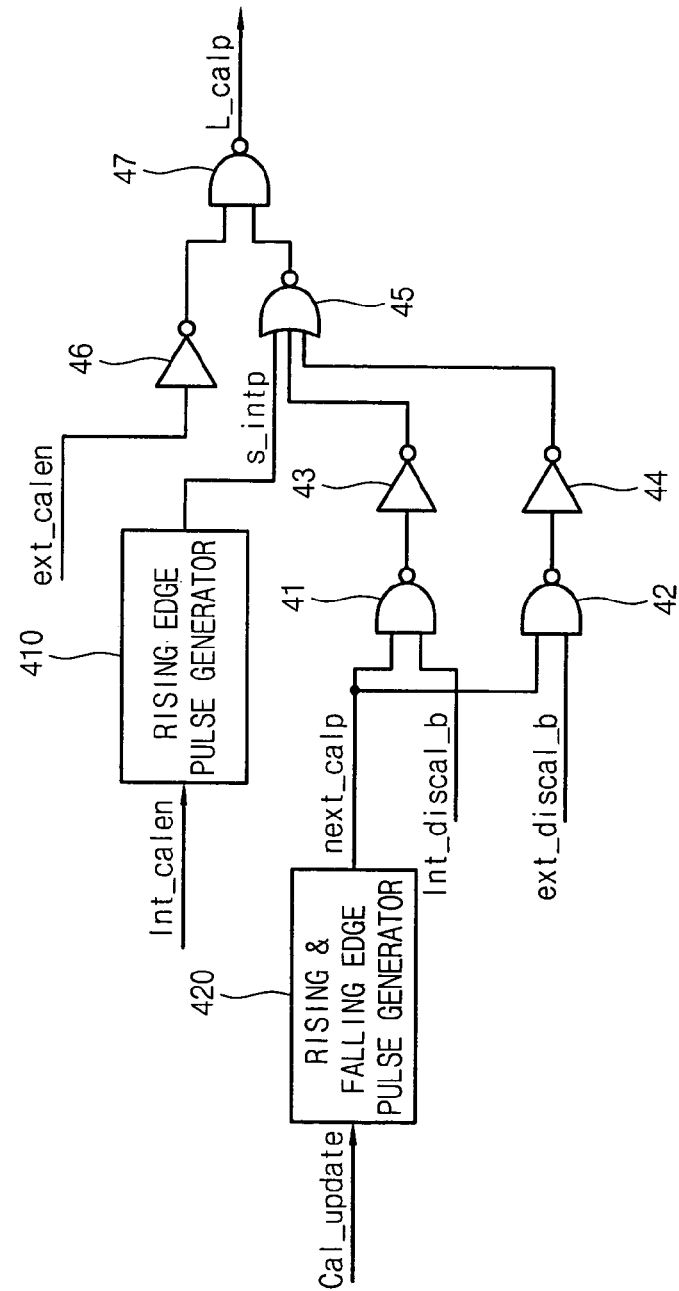
FIG. 6 is a detailed circuit illustrating a pulse generator shown in FIG. 5.

In this process, as described later with reference to FIG. 6, the pulse generator 310 generates an internal calibration start signal 's_intp' in synchronization with a rising edge of an internal calibration enable signal 'int_calen.

The pulse generator 310 for performing the above-mentioned operation includes a rising edge pulse generator 410, a rising and falling edge pulse generator 420, and a plurality of combinational logical circuits.

The rising edge pulse generator 410 generates an initially calibration start signal 's_intp' in synchronization with a rising edge of an internal calibration enable signal 'int_calen'. When the calibration start signal 's_intp' having a pulse form is enabled to be at a high level, a multi-pulse 'L_calp' is output from a NAND gate 47.

As a result, the multi-pulse 'L_calp' generated by an internal calibration enable signal 'int_calen' is output from the pulse generator 310, is input to the delay unit 340 for modeling an operation time period of the ODT impedance calibration unit 360 to be delayed for a predetermined period of time, and then is applied to the update trigger signal generator 350.

The update trigger signal generator 350 supplies an update signal 'Cal_update' for updating the ODT impedance calibration to the pulse generator 310. To be specific, the update trigger signal generator 350 receives an internal calibration enable signal 'int_calen' and a delayed multi-pulse 'L_calpd'. In this case, the update trigger signal generator 350 maintains update signal 'Cal_update' at a low level when the internal calibration enable signal 'int calen' has a low level, and outputs a signal 'Cal_update' which is toggled to the pulse generator 310 when a pulse of the delayed multi-pulse 'L_calpd' is applied to the update trigger signal generator 350.

Meanwhile, the update signal 'Cal_update' generated by the above-mentioned way is input to the rising and falling edge pulse generator 420, and the rising and falling edge pulse generator 420 outputs a signal 'next_calp' synchronized to a rising edge and a falling edge of the update signal 'Cal_update'.

Referring again to FIG. 6, a NAND gate 41 receives the output signal 'next_calp' of the rising and falling edge pulse generator 420 and the output signal 'int_discal_b' of the maximum counter trigger signal generator 330. An inverter 43 receives an output signal of the NAND gate 41. A NAND gate 42 receives the output signal 'next_calp' of the rising and falling edge pulse generator 420 and the output signal 'ext_discal_b' of the maximum counter trigger signal generator 320. An inverter 44 receives an output signal of the NAND gate 42. A NOR gate receives a calibration start signal 's_intp', an output signal of the inverter 43, and an output signal of the inverter 44. An inverter 46 receives the external calibration enable signal 'ext_calen'. A NAND gate 47 receives an output signal of the inverter 46 and an output signal of the NOR gate 45. A signal output from the NAND gate 47 is a calibration signal 'L_calp'.

Figure 7:
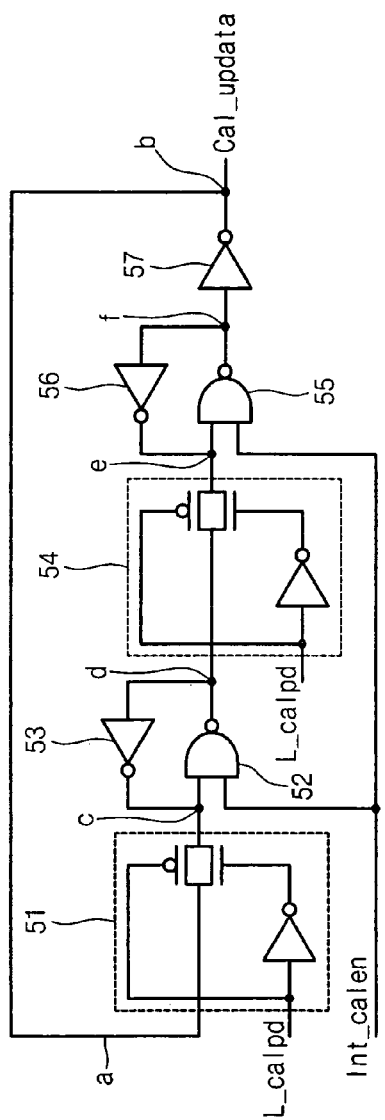
FIG. 7 is a detailed circuit illustrating an update trigger signal generator shown in FIG. 5.

Meanwhile, the update trigger signal generator 350 has in a pipeline structure as shown in FIG. 7.

Herein, the turn on/off of switches 51 and 54 are decided according to the delayed multi-pulse 'L_calpd'. That is, the switch 51 is turned on when the delayed multi-pulse 'L_calpd' has a high level, and is turned off when the delayed multi-pulse 'L_calpd' has a low level. In contrast, the switch 54 is turned off when the delayed multi-pulse 'L_calpd' has a high level, and is turned on when the delayed multi-pulse 'L_calpd' has a low level.

In FIG. 7, an input node 'a' of the switch 51 is connected to an output node 'b' of an inverter 57. An NAND gate 52, with which an inverter 53 constructs a latch, receives a signal passing through the switch 51 and the internal calibration enable signal 'int_calen'. An output node of the switch 51 is expressed as 'c'. An output signal of the NAND gate 52 is transferred to an input node 'd' of the switch 54. An output node of the switch 54 is expressed as 'e'. A NAND gate 55, with which an inverter 56 constructs a latch, receives a signal passing through the switch 54 and the internal calibration enable signal 'int_calen'. An output signal of the NAND gate 55 is transferred to an input node 'f' of the inverter 57. An output signal of the inverter 57 is an update signal 'Cal_update'.

That is, when the internal calibration enable signal 'int_calen' has a low level (i.e., when an ODT impedance calibration is not performed), the update trigger signal generator 350 outputs an update signal 'Cal_update' of a low level representing an initialization state.

Thereafter, when the internal calibration enable signal 'int_calen' changes into a high level in order to perform an ODT impedance calibration, the update trigger signal generator 350 causes the delayed multi-pulse 'L_calpd' to pass through the pipeline structure thereof, thereby outputting an update signal 'Cal_update' which is toggled in a predetermined period of time.

Meanwhile, the ODT impedance calibration unit 360 receives the calibration signal 'L_calp' and outputs 'n' number of control signals 'code<0:n−1>' for controlling the ODT impedance.

Hereinafter, the operation according to an embodiment of the present invention will be described with reference to FIG. 8.

In the initial state, an ODT impedance calibration starts by the internal calibration enable signal 'int_calen' generated in the interior of the semiconductor device. Subsequent to the initial state, the ODT impedance calibration is performed by an external calibration enable signal 'ext_calen' which is supplied from a system connected to the semiconductor device. The reason why the ODT impedance calibration is performed by an external calibration enable signal 'ext_calen' that the ODT impedance of the semiconductor device changes depending on temperature change, voltage change and the like during a normal operation thereof.

The ODT impedance calibration device according to the present invention calibrates the ODT impedance using the control signals 'code<0:n−1>', which the ODT impedance calibration unit 360 generates using a multi-pulse 'L_calp' output from the pulse generator 310.

The period of the multi-pulse 'L_calp' is decided by th delay unit 340 and the update trigger signal generator 350.

The delay unit 340 delays the multi-pulse 'L_calp' for a predetermined period of time, and the period of the multi-pulse 'L_calp' is decided under the influence of the delayed time period. The update trigger signal generator 350 outputs an update signal 'Cal_update' for calibrating the ODT impedance. The pulse generator 310 having received the update signal 'Cal_update' generates a multi-pulse 'L_calp'.

As shown in FIG. 7, a multi-pulse 'L_calp' is generated in correspondence with the period of the multi-pulse 'L_calp', and a multi-pulse 'L_calp' is again generated by the update signal 'Cal_update'.

Also, as shown in FIG. 7, a multi-pulse 'L_calp' is generated by an internal calibration enable signal 'int_calen'. When the multi-pulse 'L_calp' has 'N' number of pulses, the N-bit counter 32 having sensed the $N^{th}$ pulse controls the maximum counter trigger signal generator 330, and then the maximum counter trigger signal generator 330 changes an output signal 'int_discal_b' into a low level in correspondence with the output of the N-bit counter 32. When an output signal 'int_discal_b' of a low level is applied to the pulse generator 310, the operation of the pulse generator 310 is disabled.

Meanwhile, in a state in which the semiconductor device of the present invention is normally operating, when a multi-pulse 'L_calp' is generated by an external calibration enable signal 'ext_calen' and the multi-pulse 'L_calp' has 'M' number of pulses, the M-bit counter 31 having sensed the $M^{th}$ pulse controls the maximum counter trigger signal generator 320, and then the maximum counter trigger signal generator 320 changes an output signal 'ext_discal_b' into a low level in correspondence with the output of the M-bit counter 31. When an output signal 'ext_discal_b' of a low level is applied to the pulse generator 310, the operation of the pulse generator 310 is disabled.

That is, as shown in the timing chart of FIG. 8, an initial ODT calibration starts when an internal calibration enable signal 'int_calen' is enabled to be at a high level.

The ODT impedance calibration performed by the internal calibration enable signal 'int_calen' stops when the $N^{th}$ pulse of the multi-pulse 'L_calp' is generated.

Also, as shown in the timing chart of FIG. 8, the semiconductor device normally operating starts the ODT impedance calibration when the external calibration enable signal 'ext_calen' is enabled to be at a high level.

The ODT impedance calibration performed by the external calibration enable signal 'ext_calen' stops when the $M^{th}$ pulse of the multi-pulse 'L_calp' is generated.

As described above, the ODT impedance calibration device according to the present invention can optimize the ODT impedance during an initial operation and also can optimize the ODT impedance during a normal operation thereof.

That is, the ODT impedance calibration device according to the present invention can always optimize the ODT impedance of a semiconductor device.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An on-die termination (hereinafter, referred to as 'ODT') impedance calibration device comprising:
   a pulse generator for receiving a first enable signal supplied during an initial operation state and a second enable signal supplied from an exterior during a normal operation state and outputting a multi-pulse for calibrating an ODT impedance corresponding to reception of each of the first enable signal and the second enable signal;
   an M-bit counter and an N-bit counter for counting the number of pulses of the multi-pulse;
   a first maximum counter trigger signal generator for being enabled by the second enable signal and outputting a signal for disabling the pulse generator upon receiving a signal from the M-bit counter, the signal corresponding to a result of M bit counting of pulses of the multi-pulse;
   a second maximum counter trigger signal generator for being enabled by the first enable signal and outputting a signal for disabling the pulse generator upon receiving a signal from the N-bit counter, the signal corresponding to a result of N bit counting of pulses of the multi-pulse;
   a delay unit for delaying the multi-pulse for a predetermined period of time;
   an update trigger signal generator for controlling a time point for output control of the multi-pulse by outputting a pulse signal, which is toggled by a delay multi-pulse output from the delay unit, as an update signal to the pulse generator in an enable state of the first enable signal; and
   an ODT impedance calibration unit for receiving the multi-pulse and outputting a control signal for calibrating an ODT impedance.

2. The ODT impedance calibration device as claimed in claim 1, wherein the update trigger signal generator outputs a signal toggled in synchronization with a falling edge of an output signal of the delay unit.

3. The ODT impedance calibration device as claimed in claim 1, wherein the update trigger signal generator toggles and outputs the delay multi-pulse when the first enable signal is enabled.

4. The ODT impedance calibration device as claimed in claim 3, wherein the update trigger signal generator has a pipeline structure.

5. The ODT impedance calibration device as claimed in claim 3, wherein the update trigger signal generator includes a switch and a latch, the switch performs a switching operation by the multi-pulse, an operation of the latch for storing a signal transferred from the switch is controlled by the first enable signal, and at least two pairs of the switch and the latch are serially connected.

6. The ODT impedance calibration device as claimed in claim 1, wherein the pulse generator comprises:
   a rising edge pulse generator for outputting a calibration start signal synchronized with a rising edge of the first enable signal;
   a rising and falling edge pulse generator for outputting pulses synchronized with a rising edge and a falling edge of the update signal;
   a first NAND circuit for performing a logical NAND function on an output of the rising and falling edge pulse generator and an output of the second maximum counter trigger signal generator;
   a second NAND circuit for performing the logical NAND function on the output of the rising and falling edge pulse generator and an output of the first maximum counter trigger signal generator;
   a NOR circuit for performing a logical NOR function on outputs of the rising edge pulse generator, the first NAND circuit and the second NAND circuit; and
   a third NAND circuit for performing the logical NAND function on the second enable signal and an output of the NOR circuit, thereby outputting the multi-pulse.

* * * * *